United States Patent
Beaty et al.

(10) Patent No.: US 8,140,905 B2
(45) Date of Patent: Mar. 20, 2012

(54) INCREMENTAL PROBLEM DETERMINATION AND RESOLUTION IN CLOUD ENVIRONMENTS

(75) Inventors: Kirk A. Beaty, Yorktown Heights, NY (US); Michael R. Head, Yorktown Heights, NY (US); Andrzej Kochut, Yorktown Heights, NY (US); Anca Sailer, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/701,232

(22) Filed: Feb. 5, 2010

(65) Prior Publication Data

US 2011/0197097 A1 Aug. 11, 2011

(51) Int. Cl.
G06F 11/00 (2006.01)
(52) U.S. Cl. .......................................... 714/35
(58) Field of Classification Search ...................... 714/35
See application file for complete search history.

(56) References Cited

U.S. PATENT DOCUMENTS

| | | | |
|---|---|---|---|
| 5,928,369 A | 7/1999 | Keyser et al. | |
| 6,339,832 B1* | 1/2002 | Bowman-Amuah | 714/35 |
| 7,269,824 B2* | 9/2007 | Noy et al. | 717/127 |
| 7,475,387 B2 | 1/2009 | Chandane | |
| 7,712,085 B2* | 5/2010 | McCollum et al. | 717/130 |
| 7,890,951 B2 | 2/2011 | Vinberg et al. | |
| 2002/0073063 A1 | 6/2002 | Faraj | |
| 2003/0028861 A1* | 2/2003 | Wallman et al. | 717/128 |
| 2005/0028146 A1* | 2/2005 | Quick | 717/130 |
| 2005/0154557 A1* | 7/2005 | Ebert | 702/182 |
| 2005/0188357 A1* | 8/2005 | Derks et al. | 717/124 |
| 2006/0129994 A1* | 6/2006 | Srivastava et al. | 717/124 |
| 2006/0265707 A1* | 11/2006 | Hayes et al. | 717/174 |
| 2008/0098387 A1* | 4/2008 | Lo et al. | 717/174 |
| 2008/0127098 A1* | 5/2008 | Bates et al. | 717/124 |
| 2008/0250405 A1* | 10/2008 | Farhangi et al. | 717/177 |
| 2009/0300423 A1 | 12/2009 | Ferris | |
| 2011/0041124 A1* | 2/2011 | Fishman et al. | 717/170 |
| 2011/0145800 A1* | 6/2011 | Rao et al. | 717/133 |

OTHER PUBLICATIONS

Wang et al., Peer Pressure for Automatic Troubleshooting, Sigmetrics Performance, Jun. 12-16, 2004, New York.
CVS—Concurrent versions System, http://www.nongnu.org/cvs/.
GIT—Fast Version Control System, http://git-scm.com/.
Wheeler, Why Open Source Software / Free Software (OSS/FS, FLOSS, or FOSS)? Look at the Numbers!, available at http://www.dwheeler.com/oss_fs_why.html#tco Revised as of Apr. 12, 2007.

(Continued)

Primary Examiner — Robert Beausoliel, Jr.
Assistant Examiner — Neil Miles
(74) Attorney, Agent, or Firm — Scully, Scott, Murphy & Presser, P.C.; Louis J. Percello, Esq.

(57) ABSTRACT

Installation files are annotated, which annotations may trigger system snapshots to be taken at a plurality of points during the execution of the installation files and/or collected. During a test run, the generated snapshots are examined incrementally to determine whether the installation is success or failure at that point. Checkpoint snapshots are stored, and those indicating failure are recorded with description of the error and/or remediation that suggest how the errors may be resolved or fixed. During a production run, the annotated installation files may be executed and the checkpoint snapshots generated during the production run may be compared with those stored of the test run to incrementally identify and resolve potential problems in the production run.

23 Claims, 2 Drawing Sheets

OTHER PUBLICATIONS

Gillen et al., The Role of Linux in Reducing the Cost of Enterprise Computing, An IDC White Paper Sponsored by Red Hat Inc., IDC, Framingham, MA.

WebSphere Application Server V6 Problem Determination for Distributed Platforms, SG24-6798-00, Redbook, Nov. 20, 2005, http://www.redbooks.ibm.com/redbooks/pdfs/sg246798.pdf.

DB2 Warehouse Management: High Availability and Problem Determination Guide, SG24-6544-00, Redbook, Mar. 22, 2002, http://www.redbooks.ibm.com/redbooks/pdfs/sg246544.pdf.

IBM Support Assistant, IBM Corporation, 2009, ftp://public.dhe.ibm.com/software/websphere/techexchange/ISA_QuickView_2009.pdf.

Laadan et al., DejaView: A Personal Virtual Computer Recorder, http://74.125.113.132/search?q=cache:_pTK3eEsghkJ:citeseerx.ist.psu.edu/viewdoc/download%3Fdoi%3D10.1.1.67.9106%26rep%3Drep1%26type%3Dpdf+IT+DejaView&cd=2&hI=en&ct=clnk&gl=us&client=firefox-a.

U.S. Office Action dated Jun. 15, 2011 received in related U.S. Appl. No. 12/826,219.

CVS, Open Source Version Control, Concurrent versions System, Copyright (C) 2005-2006 Derek Robert Price & Ximbiot and Copyright (C) 1998 Free Software Foundation, Inc., 59 Temple Place—Suite 330, Boston, MA 02111, USA, http://www.nongnu.org/cvs/.

Chacon, S., GIT, Fast Version Control System, Jan. 20, 2010, http://git-scm.com/.

Gillen et al., The Role of Linux in Reducing the Cost of Enterprise Computing, An IDC White Paper Sponsored by Red Hat Inc., IDC, Framingham, MA, 2001.

Laadan et al., DejaView: A Personal Virtual Computer Recorder, SOSP '07, Oct. 14-17, 2007, Stevenson, Washington, USA, Copyright 2007 ACM 978-1-59593-591-5/07/0010, http://74.125.113.132/search?q=cache:_pTK3eEsghkJ:citeseerx.ist.psu.edu/viewdoc/download%3Fdoi%3D10.1.1.67.9106%26rep%3Drep1%26type%3Dpdf+IT+DejaView&cd=2&hI=en&ct=clnk&gl=us&client=firefox-a.

Reimer et al., Opening Black Boxes: Using Semantic Information to Combat Virtual Machine Image Sprawl, To appear in Proceedings of the 2008 ACM International Conference on Virtual Execution Environments (VEE 2008).

Cohen et al., Capturing, indexing, clustering, and retrieving system history Export, In the ACM SIGOPS Operating Systems Review, vol. 39, Issue 5, Dec. 2005.

Wespi et al., An intrusion detection system based on the Teiresias pattern discovery algorithm, in EICAR Annual Conference Proceedings, pp. 1.15, 1999.

Stearley, Towards informatic analysis of syslogs. In Proceedings of the 2004 IEEE Conference on Cluster Computing, 2004, Abstract.

U.S. Final Office Action mailed Oct. 4, 2011 in related U.S. Appl. No. 12/826,219.

* cited by examiner

FIG. 1

INCREMENTAL PROBLEM DETERMINATION AND RESOLUTION IN CLOUD ENVIRONMENTS

FIELD

The present application generally relates to computer systems, and more particularly to incremental problem determination and resolution in cloud environments.

BACKGROUND

A multitude of studies on the Total Cost of Operation (TCO) show that almost half of TCO, which in turn is five to ten times the purchase price of the system hardware and software, is spent in resolving problems or preparing for imminent problems in the system. See, for example, David A. Wheeler, "Why Open Source Software/Free Software (OSS/FS, FLOSS, or FOSS)? Look at the Numbers!", available at http://www.dwheeler.com/oss_fs_why. html#tco, Revised as of Apr. 12, 2007; and Gillen A., Kusnetzky, McLaron S., The role of Linux in reducing cost of enterprise computing, IDC white paper, January 2002. Hence, the cost of problem determination and resolution (PDR) represents a substantial part of operational costs.

Making PDR cost effective, for example, through standardization and asset reuse has not worked in traditional information technology (IT) environments. See, for example, "WebSphere Application Server V6 Problem Determination for Distributed Platforms", SG24-6798-00, Redbook, 20 Nov. 2005; and "DB2 Warehouse Management: High Availability and Problem Determination Guide", SG24-6544-00, Redbook, 22 Mar. 2002. The IT resources being dedicated to a particular customer and their applications, leads to a diversity of configuration among IT environments and applications that makes it difficult to programmatically reuse scripts, workflows, lessons learned from one environment to another.

Existing art in the area of problem determination and resolution provide methodology restricted to particular products, such as in "WebSphere Application Server V6 Problem Determination for Distributed Platforms", SG24-6798-00, Redbook, 20 Nov. 2005; and "DB2 Warehouse Management: High Availability and Problem Determination Guide", SG24-6544-00, Redbook, 22 Mar. 2002, which provide problem troubleshooting guidance from the developer perspective for WebSphere™ and DB2™, respectively. These guides, although very informative, address only potential problems that have been identified in the product pre-production phase and have been categorized in error codes integrated in the product. They do not consider the historical troubleshooting knowledge related to fixing uncategorized failures in production environment at a customer's site.

Oren Laadan, Ricardo A. Baratto, Dan B. Phung, Shaya Potter, and Jason Nieh, DejaView: A Personal Virtual Computer Recorder provides a virtual computer recorder that captures the user's computing experience, which a user can play back, search, and browse. The tool records the visual output, the corresponding checkpoint and the file system state, and allows the user to annotate particular screenshots and system snapshots for future search. The system checkpoints are related to visual changes (e.g., no checkpoint is taken if the screen does not change), rather than to system changes.

In Helen J. Wang, John C. Platt, Yu Chen, Ruyun Zhang, and Yi-Min Wang, "Peer Pressure for Automatic Troubleshooting," Association for Computing Machinery, Inc. June 2004, PeerPressure troubleshooting system uses statistics from a large sample set of machine configuration snapshots to identify a healthy machine configuration to compare a failing one and evaluate its performance. It leverages only the Windows Registry configuration data. The success rate may be reduced due to heterogeneity issues and false positives on healthy snapshots. The present disclosure, on the other hand, uses for system snapshots or the like, for comparing system checkpoints.

These existing techniques suffer from one or more of the following shortcomings: (i) address the detection of problems for a particular application or product, they are not applicable to the case when the application or product is a part of a complex distributed system; (ii) do not provide problem resolution, they do not attempt to go beyond problem determination; (iii) focus on runtime problem determination only while the error may be an installation error; (iv) look for changes in a limited set of data, not in the whole checkpoint snapshot.

BRIEF SUMMARY

A method and system for incremental problem determination and resolution in cloud environment are provided. The method, in one aspect, may include annotating checkpoints in one or more installation files, the annotating checkpoints including inserting triggers to have one or more system snapshots taken and/or collected at one or more points during the execution of the installation files on the system. The method may further include executing the one or more installation files as a test run and storing a plurality of checkpoint snapshots generated during the test run. The method may also include storing error description associated with one or more of the checkpoint snapshots if it is determined that the test run failed at one or more points corresponding to the one or more of the checkpoint snapshots.

In another aspect, the method may further include executing the one or more installation files as production run and comparing a checkpoint snapshot of the production run with the plurality of checkpoint snapshots generated during the test run. The method may also include, in response to determining that the checkpoint snapshot of the production run matches with one or more of the plurality of checkpoint snapshots generated during the test run, and the matching one or more of the plurality of checkpoint snapshots generated during the test run includes the stored error description, notifying with the stored error description.

A system for incremental problem determination and resolution in cloud environment, in one aspect, may include a processor and a storage device. The processor may be operable to execute one or more installation files as a test run, the one or more installation files having checkpoint annotations that trigger the processor to take and/or collect one or more system snapshots at one or more points during the execution of the installation files on the system. The processor further may be operable to store a plurality of checkpoint snapshots generated during the test run, and store error description associated with one or more of the checkpoint snapshots if it is determined that the test run failed at one or more points corresponding to the one or more of the checkpoint snapshots.

In another aspect, the system may include a processor operable to execute the one or more installation files as production run and compare a checkpoint snapshot of the production run with the plurality of checkpoint snapshots generated during the test run. In response to determining that the checkpoint snapshot of the production run matches with one or more of the plurality of checkpoint snapshots generated during the test run, and that the matching one or more of the plurality of checkpoint snapshots generated during the test run includes the stored error description, the processor may be further operable to present notification with the stored error description.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

The emergence of IT Cloud environments brings with it a shift from the traditional heterogeneous environment towards more homogenous ones through resource virtualization, dynamic allocation, image technology. The IT Cloud model enables opportunities for making the PDR efficient and cost effective though new processes and methodologies. The present disclosure proposes an incremental problem determination and resolution (PDR) process that covers the operations for detecting anomalies during product installation in a virtual system and providing assistance to automatically recover from the cause of the problem into a stable state. The processes and algorithms of the present disclosure may include one or more of the following capabilities: (1) to annotate an installation bundle with synchronization points that trigger virtual system checkpoints to be taken; (2) create repository of virtual system checkpoints labeled "success" or "failure" by the technical support personnel, and in case of failure suggest repair action; (3) compare the system checkpoints taken during a product installation at the points described in (1), to the correspondent checkpoints in the repository of (2); (4) update the repository of virtual system checkpoints with new failure cases or repair actions; (5) compare the system checkpoints taken during product post-installation tests to the correspondent checkpoints in the repository of (2).

The aspects of the present disclosure may provide (i) control over the IT resources that leads to a systematic approach to PDR that was not possible prior to virtual image technology; (ii) method to select the synchronization points; (iii) method and system to store and label virtual system checkpoints for PDR.

The benefits involved by the usage of the aspects of the present disclosure may be realized by the decrease of the cost of the current incident and problem management methodology, through systematizing existent data, knowledge, and expertise for reusability, as well as the avoidance of cost associated with problem determination by allowing for proactive problem resolution (fix before break) through knowledge based early notification (e.g., avoiding waiting for the end of the installation to realize it failed).

Figure 1:
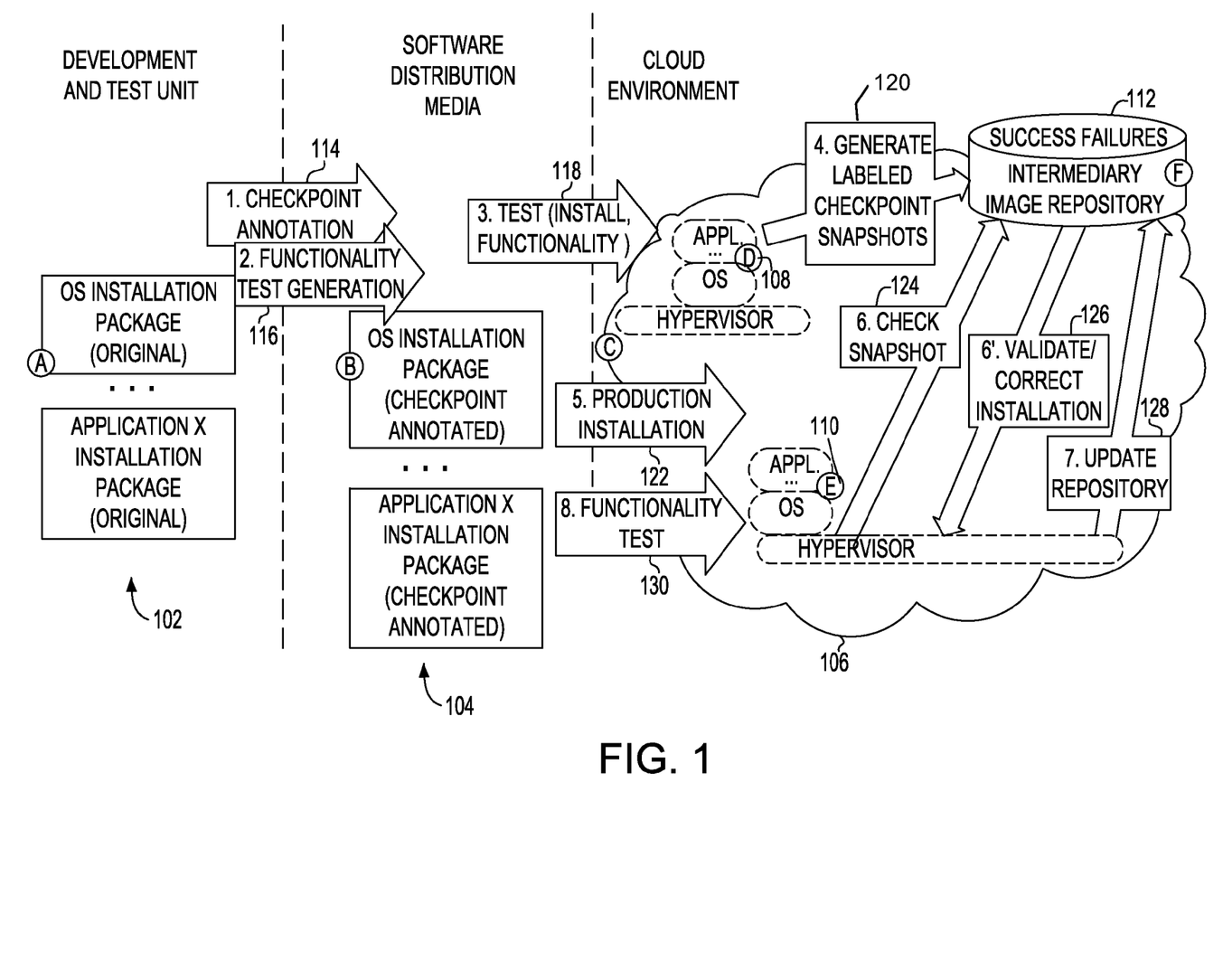
FIG. 1 illustrates an incremental PDR system in one embodiment of the present disclosure.

The incremental PDR system in one embodiment proposed by the present disclosure is shown in FIG. 1. Items, operations, and procedures involved in the system are described below.

Item A (102) represents the original installation package (e.g., exe, rpm, zip, scripts) of a software product such as an operating system, a middleware product, an application. Installation packages are also referred to as deployment packages and/or installation bundle in this disclosure. Installation packages may include multiple components that go through multi-phase set up process. For example, an installation package for a data center automation framework may include middleware (e.g., web server, application server, database management server, and directory server), the core services (a common application framework), the core components of the automation software, and the web frontend components for the application. Through the Procedure 1, Checkpoint Annotation (114), the development and test teams or others transform Item A (102) into Item B (104) by adding annotations to the installation process (e.g., installation programs or software), which will trigger at the install time the hypervisor or another system operating system or the like to take system checkpoint snapshots.

Checkpointing refers to taking snapshots of the current computer system or current application state. In computer systems, a snapshot is a copy of the state of a system at a particular point, for example, system configuration of information of a program or machine at a particular point. Checkpoint snapshot in the present disclosure refers to a snapshot taken at a point in time. A checkpoint may be also considered as being a copy of the computer's memory that is saved periodically on disk or another storage device along with the current register settings. In the event of a failure, the last saved checkpoint may be restored as a recovery point.

Annotations refer to additional codes in the installation script or the like. Such annotations tell the installation procedure or process or program to stop and wait for the snapshot to be taken. Annotating, for instance, may include editing the one or more installation files such as executables, scripts and/or others, to include system calls or application program interface calls that trigger snapshots to be taken of the system when the installation files are executed or run, and for the installation procedure (e.g., process, program and/or software) to stop and wait for the snapshot to be taken. In another aspect, for instance, for installations on systems that already have automatic and periodic checkpointing mechanism configured and enabled, annotating may include editing the installation files to include commands or the like for the installation procedure (e.g., process, program and/or software) to stop and wait for the periodic system snapshot to be taken. Annotating may be manually performed. For example, a programmer or the like person may add the annotating code in the installation script or the like. In another aspect, annotating may be performed automatically. For instance, a tool or a program may read the installation script and add code into places in the installation script. An example would be automatically detecting "delete temp files" execution in the installation script and adding automatically "take snapshot" after that execution line.

Annotations may be inserted at different points in the installation. Annotations may be inserted or placed at defined deployment (installation) phases, for example, so that the state of a given deployment phase may be identified before proceeding to the next phase or step in the installation. Annotations also may be inserted after installing a component of a multiple component product or package.

Item B (104) is the processed installation package that includes annotations added in the Procedure 1, Checkpoint Annotation (114). Additionally to the installation package annotation, the development and test teams (or another) may generate into Item B (104), via Procedure 2, Functionality Test Generation (116), a set of product functionality tests checkpoint annotated such that after the product installation, the user can validate the functionality of the product beyond the successful installation. That is, checkpoint annotations may be added into the product functionality test scripts or code or the like. For instance, after the installation of software or application, its functionality may be validated by running one or more specific tests. The tests may be running functions provided by the software or application. Those tests may be annotated so that snapshots are generated as in the installation script. Similar to the above checkpoints of the annotated installation package, the checkpoints of the annotated functionality tests will trigger the hypervisor or the like to take system checkpoint snapshots and/or wait for the snapshot to be taken.

Item C (106) represents a cloud environment with virtual machines (Items D (108), E (110)) residing on hypervisors that expose application program interfaces (APIs) allowing system checkpoint snapshots to be triggered programmatically. On such an environment the development and test teams or the like install (test) during the Procedure 3, Test (118), the checkpoint annotated products (e.g., operating system (OS), applications), as a test run. The systematically generated system checkpoint snapshots are stored in the repository Item F (112).

Each snapshot may be labeled "success" or "failure" in Procedure 4, Generate Labeled Checkpoint Snapshots (120), depending on the installation (test) status at that point, for instance, as decided by the technical personnel performing the installation (test). If a failure occurs, the technical personnel or the like may attach the corresponding error description and suggested remediation to the snapshot. Potential remediations may include, but are not limited to, restart installation, load the latest checkpoint, command scripts, and others.

In Item C (106), the customer or the like, who may be the product consumer, installs the annotated products tested above in the Procedure 5, Production Installation (122). This installation is also referred to herein as production run. Item C (106) may be the same cloud as the one the development and test teams used for their tests or can be a different one that has a copy of or link to the checkpoint snapshot repository Item F (112). As during the tests (Procedure 3 at 118), the checkpoint annotated products installed by the customer (Procedure 5 at 122) trigger checkpoint snapshots to be taken.

Each customer snapshot may be compared in Procedure 6, Check Snapshot (124), to the corresponding test snapshot stored in the repository Item F (112). Existing tools such as CVS found in "http://www.nongnu.org/cvs/" and GIT found in "http://git-scm.com/" may be used for this comparison functionality.

In Procedure 6', Validate/Correct Installation & Test (126), in case of matching a "success" labeled snapshot, the installation (test) continues. Otherwise, the failure description and remediation are presented to the customer or another to support his or her next actions. For example, the customer or another is notified of the failure status in the stored snapshot that matches the current snapshot of the production run.

Procedures 6 and 6', in one aspect, find stored file system differences to determine where problems have occurred in a given process.

In Procedure 7, Update Repository (128), failing installation (test) checkpoint snapshots, which for example caused expert level technical personnel to fix the problem are added by the technical personnel or another to the repository Item F (112) together with the corresponding error description and suggested remediation. Due to components involving complex interactions, some of which may only appear under specific circumstances, as well as to customer deployment environments of a large variety, not all aspects that may lead to failures may be detected in the test labs. Thus, for instance, the snapshots generated during the test run may be augmented and/or updated with additional information identified during the production run.

Item D (108), E (110) are virtual machines in a cloud. They contain an operating system and one or more applications. Item F (112) is a database, a collection of files, or a file resource that stores the labeled system checkpoint snapshots and any related attachment such as, but not limited to, error description and suggested remediation.

A cloud represents infrastructure that can efficiently provide IT services by taking advantage of virtualization and distributed computing. The cloud environment 106 may be private computing cloud that is contained within the enterprise, but not limited to only a private cloud. The cloud environment 106 may include enterprise level applications that provide the infrastructure enabling cloud computing services built by, for example, integrating multiple interrelated software component. The method and system described herein may be utilized when deploying a cloud computing management infrastructure.

The cloud environment 106 may include components of a computer system that may include any computing node that is able to load and execute programmatic code, for instance, running the operating system and server application suite. The system logic may be embodied as computer executable code that is loaded from a remote source (e.g., from a network file system), local permanent optical (CD-ROM), magnetic storage (such as disk), or storage into memory for execution by a central processing unit, a processor and/or cores. A network interface may be used for communicating to other network accessible services. Such an interface may include, but is not limited to a hardwired device, e.g., Ethernet over coax cable, wireless IP, and telephone to IP (VoIP), or others. The memory may include computer readable instructions, data structures, program modules and application interfaces providing logic or functional components.

It should be understood, however, that the system and method of the present disclosure is not limited to only that configuration. Thus, the components may be distributed over a network on different platforms in a distributed environment, and/or configured in a cloud computing environment. The system may include multiple processors and/or cores.

Figure 2:
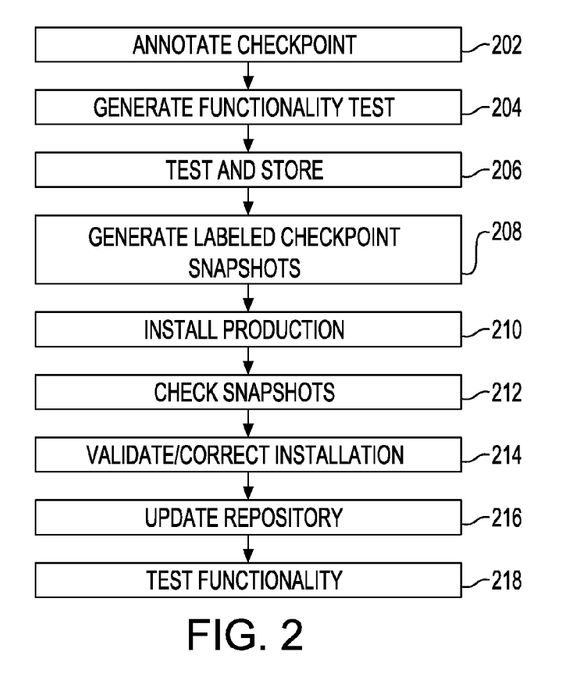
FIG. 2 illustrates control flow or logic in one embodiment of the present disclosure to incrementally determine and resolve problem in cloud environment.

FIG. 2 illustrates control flow or logic in one embodiment of the present disclosure to incrementally determine and resolve problem in cloud environment. At 202, checkpoint annotations are added to installation packages. As described above, annotations may be additional code in the installation script or like that tells the installation procedure or process trigger checkpointing and/or to stop and wait for the snapshot to be taken. Thus, installation packages are annotated for specific checkpoints at defined deployment phases so as to trigger a clone to be taken and used to get the deployment health status.

At 204, test generation functionality may be also added to the installation packages. That is, the test codes or programs that validate the installed software or application may be annotated similarly, for instance, by adding additional code that tells the test code to stop and wait for a snapshot to be taken at one or more points in the test. In addition to the deployment package annotations for image capturing, if functionality tests are available as part of the package, for example, a similar approach can be applied to validating these tests.

The installation packages may be annotated such that it triggers the system state to be captured at precise intermediary phases of the deployment and functionality tests, if any. Particular intermediary steps of the deployments may be relevant in terms of overall system status compared to others. For instance, the beginning and end of the involved components deployment may be checked for prerequisites and installation success, respectively.

In one aspect, the system state may be captured at file system level, for instance, in terms of memory used, time elapsed and practicability. The file system images may be used to characterize the condition of a particular deployment intermediary step.

At 206, the annotated installation packages or products are installed or run on the cloud as a test. For example, operating system (OS) and the applications may be installed in test environments with a goal of capturing and fixing errors as they occur, including deployment errors. The mechanism of the present disclosure triggers specific data collection at explicit deployment phases and/or installation points. For example, during the installation, the added annotations trigger the system to automatically generate system checkpoint snapshots and/or stop and wait until a snapshot is taken. The checkpoint snapshots are stored in a repository.

At 208, labels are generated for the snapshots. The labels indicate the status of the installation during the test run, for example "success" or "failure" at the point the snapshot is taken. The snapshot is labeled "success" if installation at that point succeeded. The snapshot is labeled "failure" if the installation at that point failed, for example, an error message is received that the installation failed. If a failure is detected at this point in test installation, additional information such as error description, suggested recovery or remediation or correction mechanism, may be attached to or associated with the corresponding snapshots and stored together in the repository.

In one aspect, there may be two classes of failure: deterministic and non-deterministic. Deterministic failures are those that are caused by a setting, a particular configuration of inputs to the software and items in the environment, including those in the operating system as well as in the network. The setting associated with a deterministic failure is its failure setting. Running an installation in a replica of a failure setting will reliably reproduce the associated failure. Deterministic failures may be caused by, e.g., inappropriate user input, missing operating system components, or software firewalls that block required network connections. Non-deterministic failures may or may not be reproducible. They may be triggered by performance problems that lead to problems if the software has race conditions, by unreliable hardware or device drivers, or by other environmental situations that lead to the execution of untested code. While software should be built and tested to handle such circumstances reliably, this is not always the case. Therefore, in production deployments, most of the time when failures occur, the technical support may be involved for troubleshooting, either because the issues arise for the first time, or because there is no prior knowledge captured to allow for an effective remediation reuse. An inventory of discovered potential issues that have occurred in test environments and have known remediation plans would be beneficial by itself for production deployments. Adding to this inventory the failures fixed during production deployments, would be of help also to the deployment administrator who is now able to leverage past knowledge when facing known failures.

At 210, a customer or the like installs the annotated packages in a production system for use. For instance, once a repository has been populated with sufficient labeled snapshots, the production deployments can start taking benefit of an automated deployment status validation and failure assistance. As in the test run at 206, the annotations trigger the system to generate snapshots at points of installation.

At 212, the snapshots of the production installation at defined phases or points of installation are compared to the snapshots of the test run that were generated at the corresponding defined phases or points of the test run and previously stored in the repository at each checkpoint. Relevant patterns in the snapshots may be identified. For instance, the names of the files, their sizes, content and permissions, last modification time, and others may be compared. If the matching snapshots are found, a notification may be sent to the deployment application. Based on that notification, the deployment may continue with the next step in case of success or may proceed with presenting the user the remediation suggestions in case of failure.

At 214, for matching snapshots, if the test version indicates a failure status, the associated error description and/or remediation steps are suggested to the customer or the like performing the installation.

At 216, the repository is updated. For instance, new failure type, remediation and snapshots identified under the production run are added to the repository. In another aspect, the new snapshot may be used to update the corresponding snapshot in the repository. Snapshots that do not match any of the existing patterns may be troubleshooted, for example, by the technical personnel, labeled and added to the repository.

At 218, functionality validation test may be performed. For instance, after the installation of the software or application is complete, tests may be run on the software or application to validate the workings of the software or application on the installed environment. During this functionality validation test, snapshots are generated as a result of the added annotations at step 204. If errors occur during this functionality validation test, the snapshots then may be compared with the previously stored snapshots, for instance, of a working installation. The previously stored snapshot of a working installation may be used to determine the problems in the failed installation. If previously stored snapshots that also failed exist, the remediation or resolution associated with those previously stored snapshots may be used to correct the problems that caused the errors of this functionality validation test.

The above description referred to system snapshots as the information or data being captured and collected at each point or phase in the installation or deployment. It should be noted that any other data may be captured and collected. Variety of approaches may be used to collect this type of information. For example, one or more or combination of revision control software, backup system, versioning filesystems, hypervisor-directed shanpshots, and hypervisor-directed cloning may be utilized to capture and collect system image, configuration data, or the like at a point in installation step. Revision control systems (RCS), such as GIT™, CVS™, Subversion™, may provide snapshots in time of a tree of files along with direct comparisons between arbitrary snapshots. A distributed RCS, such as Git™, Bazaar™, or Mercurial™ supports a serverless mode, where all versions are recorded locally.

Versioning filesystems, susch as CopyFS™, NILFS™, and BTRFS™, and some automated snapshotting filesystems such as Apple™ Time Machine™ or Microsoft™ Shadow COpy™ provide previous versions of files (or the entire filesystem) at points in time in the past. In hypervisor-level snapshotting, a copy-on-write is created from the disk image when the snapshot is taken. All future writes by the virtual machine (VM) to its disk are captured there, leaving the previous disk image untouched. The state of the filesystem may be captured with the VM shutdown. Hypervisors may also create a clone of a virtual machine, which contains an exact copy of all the data on the virtual machine data.

Mirage™ provides a set of APIs that enable sophisticated operations directly on dormant images within an image repository, without having to first retrieve the image or instantiate and run it. It builds on semantic information about the disk image. Mirage searchability enables disk comparisons at file-level granularity.

In the virtual technology, it may be possible to have an incremental live clone capturing to back up a remote system that allows an efficient clone generation and storage.

The mechanism of the present disclosure may provide an enhanced deployment methodology and may provide for, among other, (i) early detection of anomalies during the installation of complex software solutions, such as the cloud computing services infrastructure; (ii) capture and storage of problems' distinctiveness together with label and potential remediation for future retrieval; (iii) problem identification and assistance to automatically recover from a known problem into a stable state; (iv) problem repository update. Intermediary health status of, for example, lengthy deployments like the ones of the cloud computing services' underlining infrastructure may be identified and resolved, thus for example allowing for control of the deployment validation and troubleshooting in virtual environments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
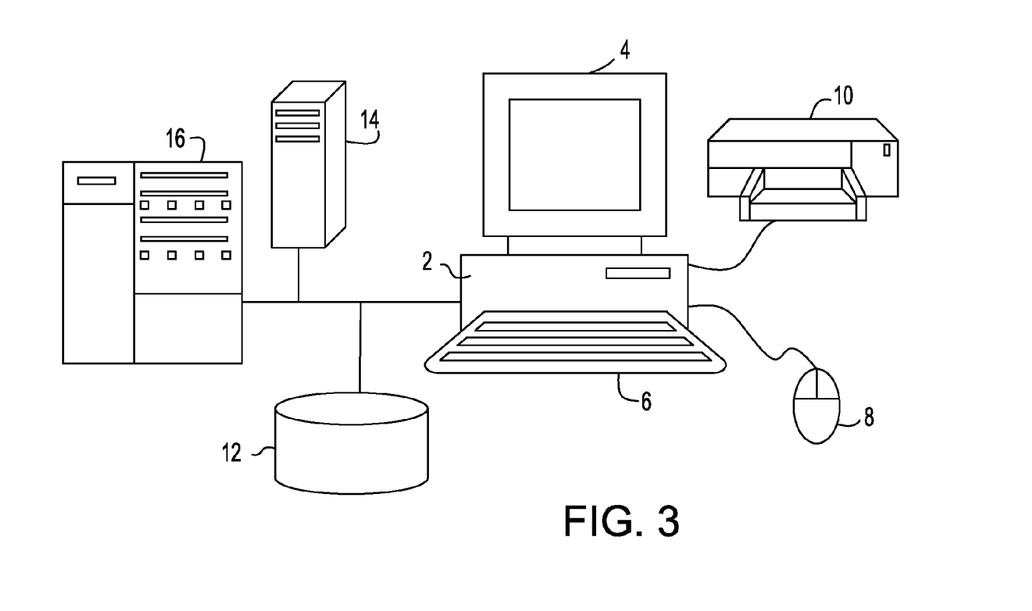
FIG. 3 illustrates an example of a computer system, in which the systems and methodologies of the present disclosure may be carried out or executed.

Referring now to FIG. 3, the systems and methodologies of the present disclosure may be carried out or executed in a computer system that includes a processing unit 2, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 2 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 4 for presenting output displays and providing a display through which the user may input data and interact with the processing system, for instance, in cooperation with input devices such as the keyboard 6 and mouse device 8 or pointing device. The computer processing system may be also connected or coupled to one or more peripheral devices such as the printer 10, scanner (not shown), speaker, and any other devices, directly or via remote connections. The computer processing system may be connected or coupled to one or more other processing systems such as a server 10, other remote computer processing system 14, network storage devices 12, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 2, 14, 16), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for incremental problem determination and resolution in computer environment, comprising:

annotating one or more installation files for checkpoints, the annotating including inserting triggers to have one or more system snapshots taken at one or more points during the execution of the installation files on the system;

executing, using a processor, the one or more installation files as a test run and storing a plurality of checkpoint snapshots generated during the test run;

attaching error description to a checkpoint snapshot and storing the error description if it is determined that the test run failed as of at a point the checkpoint snapshot is taken, the error description describing one or more of deterministic or non-deterministic factors that caused the test run to fail;

executing the one or more installation files as production run;

comparing a checkpoint snapshot of the production run with the plurality of checkpoint snapshots generated during the test run;

in response to determining that the checkpoint snapshot of the production run matches with one or more of the plurality of checkpoint snapshots generated during the test run, and the matching one or more of the plurality of checkpoint snapshots generated during the test run includes the stored error description, notifying with the stored error description.

2. The method of claim 1, further including:

storing one or more remediation suggestions associated with the checkpoint snapshot if it is determined that the test run failed, the one or more remediation suggestions including one or more of restarting installation, loading latest checkpoint image of the system, loading a command script, or combinations thereof.

3. The method of claim 2, further including:

in response to determining that the checkpoint snapshot of the production run matches with one or more of the plurality of checkpoint snapshots generated during the test run, and the matching one or more of the plurality of checkpoint snapshots generated during the test run includes the stored error description, notifying with the stored one or more remediation suggestions.

4. The method of claim 1, further including annotating functionality validation codes for checkpoints.

5. The method of claim 4, further including:

executing the functionality validation codes during the test run and during the production run; and comparing one or more functionality validation code checkpoint snapshots generated during the test run and one or more functionality validation code checkpoint snapshots generated during the production run.

6. The method of claim 1, wherein the test run and the production run are performed on a same computer system.

7. The method of claim 1, wherein the test run and the production run are performed on different computer systems.

8. The method of claim 1, further including storing the checkpoint snapshots generated during the production run.

9. A non-transitory computer readable storage medium storing a program of instructions executable by a machine to perform a method of incremental problem determination and resolution in computer environment, comprising:

annotating one or more installation files for checkpoints, the annotating including inserting triggers to have one or more system snapshots taken at one or more points during the execution of the installation files on the system;

executing, using a processor, the one or more installation files as a test run and storing a plurality of checkpoint snapshots generated during the test run;

attaching error description to a checkpoint snapshot and storing the error description if it is determined that the test run failed as of at a point the checkpoint snapshot is taken, the error description describing one or more of deterministic or non-deterministic factors that caused the test run to fail;

executing the one or more installation files as production run;

comparing a checkpoint snapshot of the production run with the plurality of checkpoint snapshots generated during the test run;

in response to determining that the checkpoint snapshot of the production run matches with one or more of the plurality of checkpoint snapshots generated during the test run, and the matching one or more of the plurality of checkpoint snapshots generated during the test run includes the stored error description, notifying with the stored error description.

10. The computer readable storage medium of claim 9, further including:

storing one or more remediation suggestions associated with the checkpoint snapshot if it is determined that the test run failed, the one or more remediation suggestions including one or more of restarting installation, loading latest checkpoint image of the system, loading a command script, or combinations thereof.

11. The computer readable storage medium of claim 10, further including:

in response to determining that the checkpoint snapshot of the production run matches with one or more of the plurality of checkpoint snapshots generated during the test run, and the matching one or more of the plurality of checkpoint snapshots generated during the test run includes the stored error description, notifying with the stored one or more remediation suggestions.

12. The computer readable storage medium of claim 9, further including annotating functionality validation codes for checkpoints.

13. The computer readable storage medium of claim 12, further including:

executing the functionality validation codes during the test run and during the production run; and comparing one or more functionality validation code checkpoint snapshots generated during the test run and one or more functionality validation code checkpoint snapshots generated during the production run.

14. The computer readable storage medium of claim 9, wherein the test run and the production run are performed on a same computer system.

15. The computer readable storage medium of claim 9, wherein the test run and the production run are performed on different computer systems.

16. A system for incremental problem determination and resolution in computer environment, comprising:

a processor;

a storage device, wherein the processor operable to execute one or more installation files as a test run, the one or more installation files having checkpoint annotations that trigger the processor to take one or more system snapshots at one or more points during the execution of the installation files on the system;

the processor further operable to store a plurality of checkpoint snapshots generated during the test run, and attach error description to a checkpoint snapshot and store the error description if it is determined that the test run failed as of at a point the checkpoint snapshot is taken, the error description describing one or more of deterministic or non-deterministic factors that caused the test run to fail.

17. The system of claim 16, wherein the processor is further operable to execute the one or more installation files as production run; the processor further operable to compare a checkpoint snapshot of the production run with the plurality of checkpoint snapshots generated during the test run; and in response to determining that the checkpoint snapshot of the production run matches with one or more of the plurality of checkpoint snapshots generated during the test run, and that the matching one or more of the plurality of checkpoint snapshots generated during the test run includes the stored error description, the processor further operable to present a notification with the stored error description.

18. The system of claim 17, wherein the processor is further operable to store one or more remediation suggestions associated with the checkpoint snapshot if it is determined that the test run failed at a point the checkpoint snapshot is taken, the one or more remediation suggestions including one or more of restarting installation, loading latest checkpoint image of the system, loading a command script, or combinations thereof.

19. The system of claim 18, wherein, in response to determining that the checkpoint snapshot of the production run matches with one or more of the plurality of checkpoint snapshots generated during the test run, and that the matching one or more of the plurality of checkpoint snapshots generated during the test run includes the stored remediation suggestion, the processor further operable to notify with the stored one or more remediation suggestions.

20. The system of claim 17, wherein the processor is further operable to execute functionality validation codes during the test run and during the production run, the functionality validation codes including annotated checkpoints that trigger system snapshots to be taken at one or more points of execution of the functionality validation codes, and the processor is further operable to compare one or more functionality validation code checkpoint snapshots generated during the test run and one or more functionality validation code checkpoint snapshots generated during the production run.

21. The system of claim 17, wherein the processor is further operable to store one or more checkpoint snapshots generated during the production run.

22. The system of claim 17, wherein the test run and the production run are performed on different computer systems.

23. A method for incremental problem determination and resolution in computer environment, comprising:

annotating one or more installation files for checkpoints, the annotating including inserting triggers to have one or more system snapshots taken at one or more points during the execution of the installation files on the system;

executing, using a processor, the one or more installation files as a test run and storing a plurality of checkpoint snapshots generated during the test run;

attaching error description to a checkpoint snapshot and storing the error description if it is determined that the test run failed as of at a point the checkpoint snapshot is taken, the error description describing one or more of deterministic or non-deterministic factors that caused the test run to fail, wherein the stored snapshots and error description are for use in executing the one or more installation files in production run and identifying potential problems and resolution incrementally during the production run at each intermediary phase of the production run corresponding to each checkpoint snapshot.

* * * * *